(12) United States Patent
Sting

(10) Patent No.: US 10,224,794 B2
(45) Date of Patent: Mar. 5, 2019

(54) RESISTANCE MODULE FOR INCREASING RUNUP TORQUE FOR A ROTOR OF AN ELECTRIC MACHINE COMPRISING A ROTOR WINDING

(71) Applicant: SIEMENS AKTIENGESELLSCHAFT, München (DE)

(72) Inventor: Joachim Sting, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 473 days.

(21) Appl. No.: 15/025,078

(22) PCT Filed: Sep. 11, 2014

(86) PCT No.: PCT/EP2014/069349
§ 371 (c)(1),
(2) Date: Mar. 25, 2016

(87) PCT Pub. No.: WO2015/043966
PCT Pub. Date: Apr. 2, 2015

(65) Prior Publication Data
US 2016/0268880 A1    Sep. 15, 2016

(30) Foreign Application Priority Data
Sep. 26, 2013    (EP) .................................... 13186076

(51) Int. Cl.
*H02K 21/46*      (2006.01)
*H01C 3/16*       (2006.01)
(Continued)

(52) U.S. Cl.
CPC ............... *H02K 21/46* (2013.01); *H01C 3/16* (2013.01); *H01C 7/22* (2013.01); *H02K 11/042* (2013.01); *H02K 19/36* (2013.01); *H02P 1/027* (2013.01)

(58) Field of Classification Search
CPC ......... H02K 21/46; H02K 19/14; H02K 19/36
See application file for complete search history.

(56) References Cited

U.S. PATENT DOCUMENTS 3,011,083 A * 11/1961 Jacob ........................ H01G 4/32
                                                                310/72
4,211,944 A *  7/1980 Haller .................... H02K 17/08
                                                                310/72
(Continued)

FOREIGN PATENT DOCUMENTS

CN          2093460 U       1/1992
CN          2376128 Y       4/2000
(Continued)

*Primary Examiner* — Dang Le
(74) *Attorney, Agent, or Firm* — Henry M. Feiereisen LLC

(57) ABSTRACT

A resistance module for increasing a runup torque for a rotor of an electric machine with a rotor winding includes first and second connection points, a plurality of electrically-conductive layers electrically connected to the first and second connection points. Each of the layers surrounds an axis of the resistance module at least partially in a circumferential direction and has a layer start point and a layer end point. At least one of the layers is configured in an undulating shape in the circumferential direction, with undulations projecting radially outwards. A first insulating layer is disposed between neighboring ones of the layers. The layer end point of one of the layers is electrically connected at a tie point to the layer start point of a neighboring one of the layers. At (Continued)

least one fastening element is disposed between two neighboring undulations in the circumferential direction and radially outside of the layers.

21 Claims, 4 Drawing Sheets

(51) Int. Cl.
*H01C 7/22* (2006.01)
*H02K 19/36* (2006.01)
*H02K 11/042* (2016.01)
*H02P 1/02* (2006.01)

(56) References Cited

U.S. PATENT DOCUMENTS

| | | |
|---|---|---|
| 4,319,216 A | 3/1982 | Ikeda et al. |
| 5,322,672 A | 6/1994 | Breuer et al. |
| 5,548,169 A * | 8/1996 | Iwasa ............ H02K 17/30 310/68 R |
| 5,796,196 A | 8/1998 | Johnsen et al. |
| 5,962,942 A | 10/1999 | Pullen et al. |

FOREIGN PATENT DOCUMENTS

| | | |
|---|---|---|
| CN | 102130554 A | 7/2011 |
| CN | 102170257 A | 8/2011 |
| DE | 395952 C | 5/1924 |
| DE | 102011004660 A1 | 8/2012 |
| EP | 1071192 A2 | 1/2001 |
| EP | 2605252 A1 | 6/2013 |
| FR | 2836592 A1 | 8/2003 |
| RU | 12319 U1 | 12/1999 |
| RU | 68175 U1 | 11/2007 |
| RU | 2474037 C1 | 1/2013 |

* cited by examiner

RESISTANCE MODULE FOR INCREASING RUNUP TORQUE FOR A ROTOR OF AN ELECTRIC MACHINE COMPRISING A ROTOR WINDING

CROSS-REFERENCES TO RELATED APPLICATIONS

This application is the U.S. National Stage of International Application No. PCT/EP2014/069349, filed Sep. 11, 2014, which designated the United States and has been published as international Publication No. WO 2015/043966 and which claims the priority of European Patent Application, Ser. No. 13186076.9, filed Sep. 26, 2013, pursuant to 35 U.S.C. 119(a)-(d).

BACKGROUND OF THE INVENTION

The invention relates to a resistance module for increasing runup torque for a rotor of an electric machine comprising a rotor winding. The invention further relates to an exciter, a rotor and an electric machine, each having at least one such resistance module.

Such a resistance module is used for example in externally-excited synchronous machines with a rotor winding. During the runup phase such an electric machine has a comparatively large slip and runs up asynchronously. In such cases it is known that a reduction of the runup current in the rotor winding leads to an increase in the runup torque.

An electric motor with a rotor with two rotor windings is known from DE 39 59 52, wherein the rotor winding disposed radially further outwards has a large electrical resistance and the rotor winding disposed radially further inwards has a small electrical resistance. During the runup period the electric motor exhibits a high level of slip and the rotor winding with the large electrical resistance causes a high runup torque.

SUMMARY OF THE INVENTION

The underlying object of the invention is to provide an alternative to known solutions for increasing the runup torque.

This object is achieved by a resistance module of the type stated at the outset by the resistance module having the following:
  a first connection point and a second connection point,
  at least two electrically-conductive layers,
wherein the at least two layers are electrically connected to the first connection point and to the second connection point, wherein the at least two layers each surround an axis of the resistance module at least partially in the circumferential direction and each have a layer start point and a layer end point,
  a corresponding first insulating layer, which is disposed between two layers in each case,
  a corresponding tie point, at which the layer end point of a corresponding layer is electrically connected to the layer start point of the corresponding following layer.

This object is further achieved by an exciter of the type stated at the outset by the exciter having:
  a secondary winding able to be connected in a torsion-proof manner to a shaft of the electric machine,
  a rectifier connected electrically to the secondary winding,
  an inventive resistance module connected electrically to the rectifier.

This object is further achieved by a rotor of the type stated at the outset, by the rotor having an inventive resistance module or an inventive exciter as well as a rotor winding which is electrically connected to the resistance module.

Finally this object is achieved by an electric machine of the type stated at the outset, by the electric machine having an inventive resistance module or an inventive exciter or an inventive rotor.

The at least two electrically-conductive layers, which are each made of a resistive material, are connected between the first connection point and the second connection point. By coupling the resistance module to the rotor winding, meaning in particular through a series connection of the resistance module with the rotor winding, the runup current flowing during the runup phase through the rotor winding can be reduced, which leads to an increase in the startup torque. Thus the inventive resistance module makes it possible to furnish an electric machine with enhanced dynamics during the startup phase.

The resistance module has at least two layers of a resistive material, wherein different layers can also comprise different materials. The layers are connected electrically in series, in that the layer end point of one layer is connected in each case to the layer start point of the following layer. Only at the start of the series is the layer start point of the first layer connected to the first connection point of the resistance module, wherein the layer end point of the last layer is connected to the second connection point of the resistance module. A first insulating layer is applied in this case between the corresponding layers, which prevents a short circuit or an undesired lowering of the resistance.

The layers connected electrically in series can in this case especially be disposed or stacked following on from one another in the radial or axial direction.

The corresponding layers in this case surround the axis of the resistance module and thus also of the rotor or of the electric machine at least partially, wherein the corresponding layer encloses or surrounds the axis especially along at least ¾ of the full circumference.

The desired electrical resistance can be realized by an appropriate material being selected and above all by a number of layers required for this purpose being used. The resistance module is thus able to be modular in its construction, making it light and easy to manufacture. In addition this gives the at least two layers a comparatively large surface, which promotes good heat dissipation and thus good cooling of the resistance module.

The resistance module in this case can be used in an exciter for a rotor of a separately excited synchronous machine. These types of machine can be designed as synchronous motors for example. Furthermore the resistance module can be used for a rotor of such a separately excited synchronous machine.

Preferably the electric machine is able to be operated with an output of at least 1 MW, especially more than 10 MW. In such cases the electric machine can be designed as a motor and can be a synchronous machine or a separately excited synchronous machine for example. It is thus conceivable for example for the electric machine to involve a ring motor or a mill drive motor.

In an advantageous embodiment of the invention the at least two layers are disposed coaxially to the axis and embodied in a helical shape.

For the helical-shaped embodiment of the at least two layers a first layer in the circumferential direction can for example make an almost complete rotation around a circle with an essentially constant radius, wherein in the axial direction an offset arises between the layer start point and the layer end point of the first layer. A second layer, following the first layer, is connected after the tie point to the first layer and has a similar shape to the first layer. Furthermore the resistance module can have a number of such layers.

In an alternative advantageous embodiment of the invention neighboring layers run in each case from their corresponding layer start point to their corresponding layer end point in the opposing direction of rotation.

For example a first layer, in an axial overhead view of the resistance module, can run in the clockwise direction and a second layer connected in series with the first layer can run in the counterclockwise direction. It is of advantage in this case that such as resistance module only represents one electrical resistance and behaves neutrally in magnetic terms, i.e. especially does not form a coil that would create an axially directed magnetic field.

In a further advantageous embodiment of the invention at least one of the layers is embodied as flat material or sheet metal and/or consists mainly of aluminum.

In particular, for at least one of the layers, an electric sheet steel or an arrangement that is similar to a laminated core of an electric machine can be used. Layers of the resistance module built up in this way are especially easy to obtain and give the resistance module great mechanical robustness.

Aluminum has a comparatively low density, so that the dynamics of the rotor or of the electric machine can be additionally improved, especially during the runup phase.

In a further advantageous embodiment of the invention the resistance module has a hub disposed coaxially to the axis, to which the at least two layers are connected in a torsion-proof manner, wherein the hub is able to be connected in a torsion-proof manner to a shaft of the electric machine.

In particular the at least two layers can be fastened to the radially outer side of the hub, in order to establish a torsion-proof connection between the at least two layers and the hub. To establish the connection the at least two layers can however be disposed at least partly offset in the axial direction to the hub.

The hub can finally be connected to a shaft or the rotor of the electric machine in a torsion-proof manner in order to couple the resistance module mechanically to the rotor of the electric machine. This coupling can be achieved by clamping pins for example, which are pushed through holes running axially through the hub and clamp the hub to the shaft or to the rotor. In particular insulated clamping pins can be used for this purpose, which are electrically insulated from the hub and the at least two layers by means of an insulating layer, wherein a insulating layer can be provided additionally between the hub and the shaft or the rotor.

In a further advantageous embodiment of the invention a second insulating layer is disposed in this case between the hub and the at least two layers.

The second insulating layer offers an especially reliable option for insulating the at least two layers electrically from the hub and thus from the shaft or the rotor.

In a further advantageous embodiment of the invention at least one of the layers is embodied in an undulating shape in the circumferential direction, wherein the undulations project radially outwards.

The layer in an undulating shape can be compared for example with corrugated sheet steel that is guided at least partially in the circumferential direction around the axis. In this case several of the layers or all layers of the resistance module can be embodied in an undulating shape.

The corresponding layer, curved in an undulating shape, thus has undulations projecting outwards, wherein the electrical resistance for a corresponding electric current is increased within the corresponding layer by an extended distance to be covered. Such a resistance module thus allows a comparatively large electrical resistance while retaining a compact design.

At the same time the surface of the at least two layers is increased, through which the cooling performance can be greatly enhanced. In addition the undulations act like propeller blades of a radial fan, so that the cooling is further advantageously influenced. In principle it is also conceivable in this case for the resistance module to have a number of layers disposed in an undulating shape, which are disposed behind one another in an axial direction and are offset slightly in relation to one another in the circumferential direction, whereby propeller blades similar to those of an axial fan are emulated. On the one hand this embodiment allows a powerful cooling of the resistance module and on the other hand promotes a flow of cooling air in the axial direction, which can be modified for cooling the rotor or other components of the electric machine.

Finally the undulations allow a practically unimpeded thermal expansion of the corresponding layer, without mechanical stresses, which could be problematical for the stability of the resistance module, being caused by said expansion.

In a further advantageous embodiment of the invention the resistance module in this case has at least one fastening element, which is disposed in each case between two neighboring undulations in the circumferential direction and on the radial outside of the at least two layers.

The at least one fastening element accordingly adjoins the at least two layers on their radial outer side or is disposed on the radial outer surface of the at least two layers. Viewed in the circumferential direction, the at least one fastening element is disposed between two neighboring undulations projecting radially outwards.

As explained above, the layer embodied in an undulating shape can be compared to corrugated sheet metal, wherein the at least one fastening element is disposed, in accordance with this analogy, on the outer side of the corrugated sheet metal in a valley between two peaks.

Thus the at least one fastening element allows a centrifugal forces directed radially outwards, which act around the axis on the at least two layers during the rotation of the resistance module, to be reliably accommodated. For example the corresponding fastening element can be in contact radially inwards with the at least two layers by making a form fit, so that a large contact surface is available for accepting mechanical forces, through which damage to the insulation of the at least two layers can be prevented. For connection with further machine elements the at least one fastening element can have an area embodied as pins for example, which is connected by means of a screw connection or plug-in connection or the like to the further machine elements, especially to a shaft or to the rotor of the electric machine.

Therefore the mechanical stability of the resistance module is greatly increased by the at least one fastening element, especially by a number of fastening elements. Preferably a fastening element is provided in each case for each space between two neighboring undulations located in the circumferential direction. In particular the corresponding fastening element can be connected to the hub in a torsion-proof manner.

In a further advantageous embodiment of the invention the at least one fastening element is rigidly connected to the at least two layers in this case, wherein a third insulating layer is disposed between the at least one fastening element and the at least two layers.

Good electrical insulation is guaranteed between the at least two layers and the corresponding fastening element by the third insulating layer.

In a further advantageous embodiment of the invention the resistance module has a fastening ring disposed coaxially to the axis in this case, which is disposed in the axial direction adjoining the at least two layers, wherein the at least one fastening element is connected in a torsion-proof manner to the fastening ring.

The corresponding fastening element can be embodied in this case such that it engages in the axial direction into the fastening ring in each case, through which a torsion-proof connection of the corresponding fastening element with the fastening ring is established. As an alternative or in addition, there can conversely be provision for the axial fastening ring to have axial projections that engage into the corresponding fastening element The fastening ring thus imparts additional stability to the resistance module, since centrifugal forces directed radially outwards, which act on the at least two layers, are able to be transferred via the corresponding fastening element to the fastening ring.

In addition there can be provision for the fastening element to have at least one support element, which is disposed in each case radially outside on the radial end of at least one of the undulations and by means of which forces of the corresponding layer directed radially outwards are able to be accepted.

In particular the fastening ring is connected to the hub in a torsion-proof manner, wherein it is also conceivable for the fastening ring to be embodied in one piece with the hub.

The inventive exciter can for example also have a primary winding disposed as a stationary winding, with which an electrical current is able to be transferred to the secondary winding. Furthermore capacitors and if necessary ohmic resistors can be provided for smoothing the secondary current rectified by the rectifier. In this case the rotor winding is able to be supplied with the secondary current, wherein the resistance module is connected in series with the rotor winding.

In a further advantageous embodiment of the invention the at least two layers of the resistance module are able to be bridged by means of a first switch or by means of a second switch.

The resistance module increases the electrical resistance, which leads during the runup phase of the rotor to an increased runup torque and thus to increased dynamics of the rotor. As soon as the electric machine has started up and the rotor has reached its operational speed for example, the additional electrical resistance of the resistance module can be dispensed with. To this end the first switch or the second switch is connected in parallel with the resistance module, so that a short circuit of the corresponding switch bridges the resistance module.

The corresponding switch can be embodied in this case as a mechanically-actuatable component or as an electronic switch. In particular the corresponding switch can be embodied as a transistor or thyristor, which is especially activated by a control unit.

In particular the first switch can be embodied as a part of the resistance module or as a part of the exciter and the second switch as a part of the rotor or as a part of the electric machine. It is also conceivable to provide just one switch overall for bridging the resistance module. The control unit in this case can be embodied as part of the resistance module, the exciter or the rotor.

BRIEF DESCRIPTION OF THE DRAWING

The invention is described and explained in greater detail below with reference to the exemplary embodiments shown in the figures, in which.

DETAILED DESCRIPTION OF PREFERRED EMBODIMENTS

Figure 1:
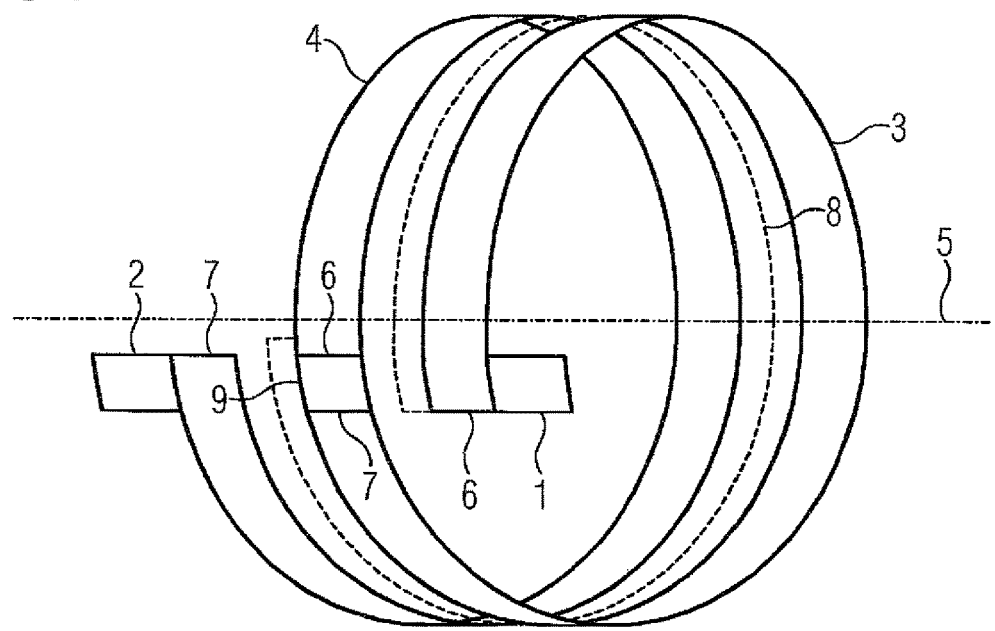
FIG. 1 shows a first exemplary embodiment of the inventive resistance module.

FIG. 1 shows a first exemplary embodiment of the inventive resistance module. The resistance module has a first connection point 1 and a second connection point 2, between which a first layer 3 and a second layer 4 are connected electrically. The two layers 3, 4 are electrically conductive, mainly consist of a resistive material and each have a layer start point 6 and a layer end point 7. In this case the first layer 3 is connected electrically at its layer end point 7 to the second layer 4 at its layer start point 8 via a tie point 9, wherein the two layers 3, 4 are otherwise electrically insulated from one another by means of a first insulating layer 8 disposed between the two layers 3, 4. The two layers 3, 4 are essentially formed in a U shape and surround an axis 5 of the resistance module at least partially.

Within the context of the first exemplary embodiment the two layers 3, 4 are disposed coaxially in relation to the axis 5 and are embodied in a helical shape. For this the first layer 3 is formed between its layer start point 6 and its layer end point 7 in the circumferential direction along a circle with an essentially constant radius, wherein in the axial direction there is an offset between its layer start point 6 and its layer end point 7. The second layer 4 adjoins the first layer 3 after the tie point 9 and is formed in a similar way to the first layer 3, in order to continue the helical shape.

Figure 2:
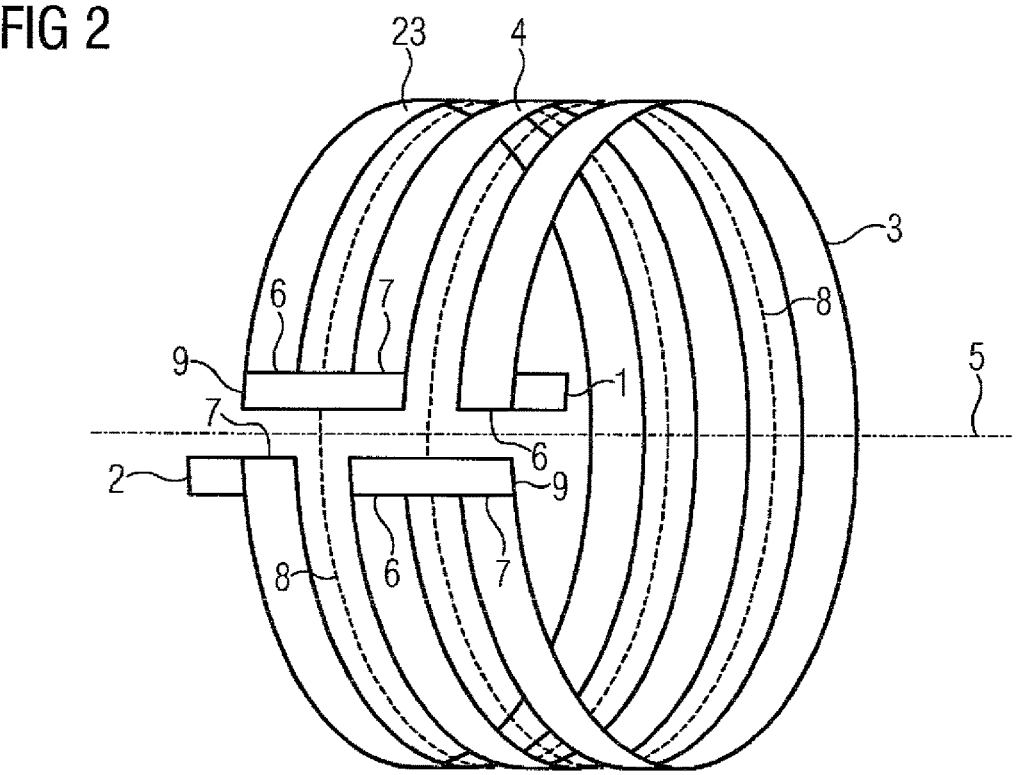
FIG. 2 shows a second exemplary embodiment.

FIG. 2 shows a second exemplary embodiment of the inventive resistance module. In this figure the same reference characters designate the same objects as in FIG. 1.

Unlike the resistance module of the first exemplary embodiment, three layers 3, 4, 23 are provided, which do not now have a helical-shaped embodiment. Instead the layers 3, 4, 23 do not have any axial offset between their corresponding layer start point 6 and their corresponding layer end point 7. The first layer 3 represents an electrical connection between the first connection point 1 and the tie point 9 between the first layer 3 and the second layer 4, wherein this connection runs in the clockwise direction in the diagram depicted in FIG. 2. By contrast the second layer 4 represents an electrical connection between the tie point 9 between the first layer 3 and the second layer 4 on the one side and the tie point 9 between the second layer 4 and the third layer 23 on the other side, wherein this connection runs in the counterclockwise direction. Finally the third layer 23 represents a corresponding connection, which runs in the clockwise direction.

Figure 3:
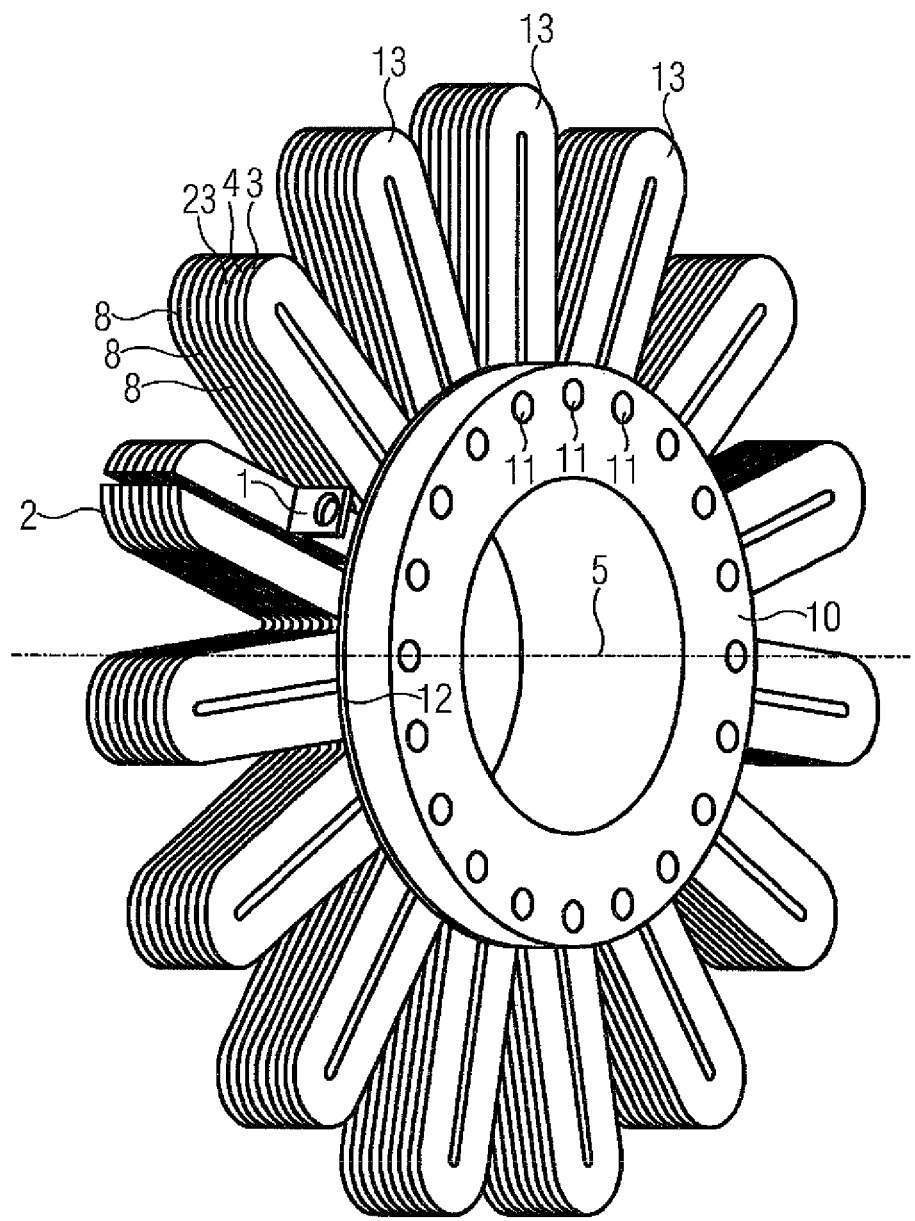
FIG. 3 shows a third exemplary embodiment.

FIG. 3 shows a third exemplary embodiment of the inventive resistance module. As a result of the perspective view the second connection point 2 is not shown, wherein, for the purposes of improved clarity, the corresponding layer start points 6, layer end points 7 and tie points 9 are not identified in any greater detail. The resistance module, within the context of the third exemplary embodiment, has the layers 3, 4, 23 etc., which, as in the first exemplary embodiment, can be embodied in a helical shape and coaxial to the axis 5 or, as in the second exemplary embodiment, alternating with a different direction of rotation.

The present resistance module is characterized in that the layers 3, 4, 23 etc. are embodied in an undulating shape in the circumferential direction, wherein the undulations 13 project radially outwards. Furthermore the resistance module has a hub 10, to which the layers 3, 4, 23 etc. are connected in a torsion-proof manner and which is insulated from the layers 3, 4, 23 etc. by means of a second insulating layer 12.

The hub 10 has holes 11 inserted in the axial direction, with which the hub 10 and thus the resistance module can be fastened to a shaft or to a rotor of the electric machine.

Figure 4:
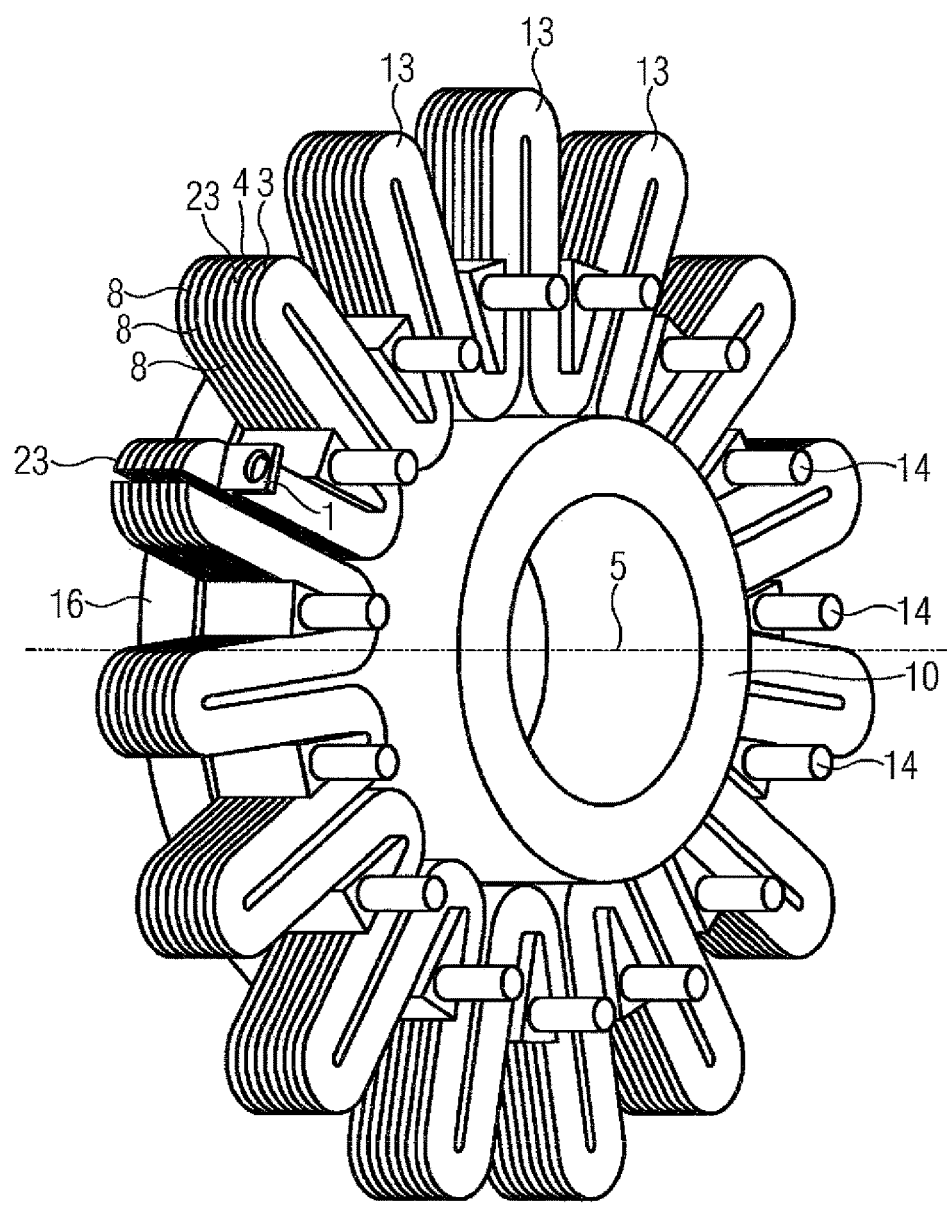
FIG. 4 shows a fourth exemplary embodiment.

FIG. 4 shows a fourth exemplary embodiment of the inventive resistance module, wherein the diagram corresponds to that of the third exemplary embodiment. The layers 3, 4, 23 etc. can be embodied similarly to those of the resistance module of the third exemplary embodiment. Within the context of the fourth exemplary embodiment the resistance module has fastening elements 14, which are disposed in each case between two neighboring undulations 13 in the circumferential direction and on the radial outside of the layers 3, 4, 23 etc. The corresponding fastening elements 14 in this case are rigidly connected to the layers 3, 4, 23 etc.

The resistance module additionally has a fastening ring 16, which is disposed coaxially to the shaft 5 and which is disposed in the axial direction adjacent to the layers 3, 4, 23 etc. The corresponding fastening elements 14 are rigidly connected to the fastening ring 16, which is connected to the hub 10 in a torsion-proof manner. Within the context of the exemplary embodiment the respective fastening elements 14 have pins projecting axially from the resistance module, which can be used for connecting the resistance module to a shaft or to a rotor of the electric machine.

Figure 5:
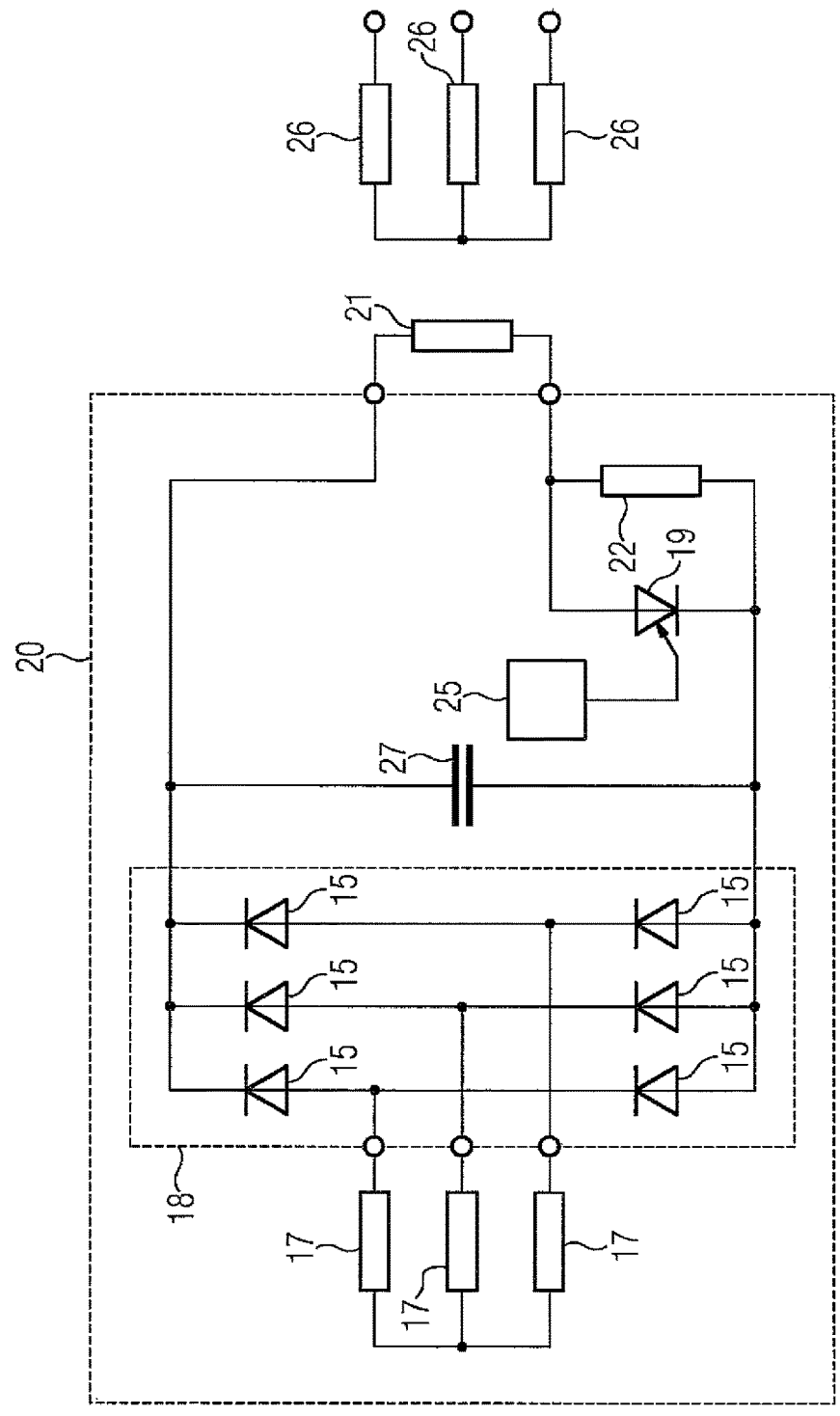
FIG. 5 shows a circuit diagram of an exemplary embodiment of an inventive electric machine.

FIG. 5 shows a circuit diagram of an exemplary embodiment of an inventive electric machine. The electric machine has a primary winding 24, by means of which an electrical current is able to be transmitted to secondary windings 17. An AC current transmitted to the secondary windings 17 can be rectified by means of a rectifier 18, which has rectifier diodes 15, and subsequently smoothed by means of a capacitor 27. The rectified and smoothed current is fed to a rotor winding 21, the magnetic field of which interacts with a magnetic field created by the stator winding 26.

To reduce the current during the runup phase an electrical resistance 22 of the inventive resistance module is connected in series with the rotor winding 21. The reduction of the runup current in this case causes an increased runup torque, through which the rotor can be accelerated especially dynamically. The resistance 22 of the resistance module can be short circuited by means of a switch 19 embodied as a thyristor, which is disposed in parallel to the resistance 22. A control unit 25 applies appropriate control signals to the switch 19 for this purpose, wherein the control unit 25 is connected in an appropriate manner to the switch 19 for this purpose and for example detects the voltage at the capacitor 25, the voltage and/or the current at the secondary windings 17 or the like.

The electric machine thus has a rotor with the rotor winding 21 and an exciter 20, wherein the exciter 20 comprises the secondary windings 17, the rectifier 18, the capacitor 27, the control 25, the switch 19 and the resistance module 22. In particular the exciter 20 can be embodied as a part of the rotor. Furthermore the electric machine has a primary winding 24 and stator windings 26.

In summary, the invention relates to a resistance module for increasing the runup torque for a rotor of an electric machine with a rotor winding. The invention further relates to an exciter, a rotor and an electric machine, which each have at least one such resistance module. In order to provide an alternative to known solutions for increasing the runup torque, it is proposed that the resistance module has the following:

a first connection point and a second connection point,
at least two electrically-conductive layers,
wherein the at least two layers are electrically connected to the first connection point and to the second connection point,
wherein the at least two layers each surround an axis of the resistance module at least partially in the circumferential direction and each have a layer start point and a layer end point,
a corresponding first insulating layer, which is disposed between two layers in each case,
a corresponding tie point, at which the layer end point of a corresponding layer is electrically connected to the layer start point of the corresponding following layer.

What is claimed is:

1. A resistance module for increasing a runup torque for a rotor of an electric machine with a rotor winding, said resistance module comprising:
a first connection point;
a second connection point;
a plurality of electrically-conductive layers electrically connected to the first connection point and to the second connection point, each of the layers surrounding an axis of the resistance module at least partially in a circumferential direction and having a layer start point and a layer end point, at least one of the layers configured in an undulating shape in the circumferential direction, with undulations projecting radially outwards;
a first insulating layer disposed between neighboring ones of the layers,
a tie point to which the layer end point of one of the layers is electrically connected to the layer start point of a neighboring one of the layers; and
at least one fastening element disposed between two neighboring undulations in the circumferential direction and radially outside of the layers.

2. The resistance module of claim 1, wherein the layers are disposed in coaxial relationship to the axis and configured in a helical shape.

3. The resistance module of claim 1, wherein neighboring layers extend from their layer start point to their layer end point in an opposing direction of rotation.

4. The resistance module of claim 1, wherein at least one of the layers is configured in the form of a flat material or of sheet steel and/or made predominantly of aluminum.

5. The resistance module of claim 1, further comprising a hub disposed in coaxial relationship to the axis and connected with the layers in a torsion-proof manner, said hub configured for connection with a shaft of the electric machine in a torsion-proof manner.

6. The resistance module of claim 5, further comprising a second insulating layer disposed between the hub and the layers.

7. The resistance module of claim 1, wherein the at least one fastening element is connected rigidly to the layers, and further comprising a third insulating layer disposed between the at least one fastening element and the layers.

8. The resistance module of claim 1, further comprising a fastening ring arranged in coaxial relationship to the axis and disposed in an axial direction adjacent to the layers, said at least one fastening element being connected to the fastening ring in a torsion-proof manner.

9. An electric machine, comprising a resistance module as set forth in claim 1.

10. An exciter for increasing a runup torque for a rotor of an electric machine with a rotor winding, said exciter comprising:
 a secondary winding configured for connection to a shaft of the electric machine in a torsion-proof manner;
 a rectifier connected electrically to the secondary winding; and
 a resistance module connected electrically to the rectifier, said resistance module comprising a first connection point, a second connection point, a plurality of electrically-conductive layers electrically connected to the first connection point and to the second connection point, each of the layers surrounding an axis of the resistance module at least partially in a circumferential direction and having a layer start point and a layer end point, at least one of the layers configured in an undulating shape in the circumferential direction, with undulations projecting radially outwards, a first insulating layer disposed between neighboring ones of the layers, a tie point to which the layer end point of one of the layers is electrically connected to the layer start point of a neighboring one of the layers, and at least one fastening element disposed between two neighboring undulations in the circumferential direction and radially outside of the layers.

11. The exciter of claim 10, further comprising a switch configured to bridge the layers of the resistance module.

12. The exciter of claim 10, wherein the layers are disposed in coaxial relationship to the axis and configured in a helical shape.

13. The exciter of claim 10, wherein neighboring layers extend from their layer start point to their layer end point in an opposing direction of rotation.

14. The exciter of claim 10, wherein at least one of the layers is configured in the form of a flat material or of sheet steel and/or made predominantly of aluminum.

15. The exciter of claim 10, wherein the resistance module includes a hub disposed in coaxial relationship to the axis and connected with the layers in a torsion-proof manner, said hub configured for connection with a shaft of the electric machine in a torsion-proof manner.

16. The exciter of claim 15, wherein the resistance module includes a second insulating layer disposed between the hub and the layers.

17. The exciter of claim 16, wherein the at least one fastening element is connected rigidly to the layers, said resistance module including a third insulating layer disposed between the at least one fastening element and the layers.

18. The exciter of claim 10, wherein the resistance module includes a fastening ring arranged in coaxial relationship to the axis and disposed in an axial direction adjacent to the layers, said at least one fastening element being connected to the fastening ring in a torsion-proof manner.

19. A rotor of an electric machine, comprising:
 a resistance module comprising a first connection point, a second connection point, a plurality of electrically-conductive layers electrically connected to the first connection point and to the second connection point, each of the layers surrounding an axis of the resistance module at least partially in a circumferential direction and having a layer start point and a layer end point, at least one of the layers configured in an undulating shape in the circumferential direction, with undulations projecting radially outwards, a first insulating layer disposed between neighboring ones of the layers, a tie point to which the layer end point of one of the layers is electrically connected to the layer start point of a neighboring one of the layers, and at least one fastening element disposed between two neighboring undulations in the circumferential direction and radially outside of the layers; and
 a rotor winding electrically connected to the resistance module.

20. The rotor of claim 19, further comprising a switch configured to bridge the layers of the resistance module.

21. The rotor of claim 19, further comprising a secondary winding configured for connection to a shaft of the electric machine in a torsion-proof manner, and a rectifier connected electrically to the secondary winding, said resistance module being connected electrically to the rectifier.

* * * * *